(12) United States Patent
Poirier

(10) Patent No.: US 11,193,540 B2
(45) Date of Patent: Dec. 7, 2021

(54) SPLIT BALL BEARING CONSTRUCTION

(71) Applicant: PRATT & WHITNEY CANADA CORP., Longueuil (CA)

(72) Inventor: Cedric Poirier, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/854,997

(22) Filed: Apr. 22, 2020

(65) Prior Publication Data

US 2021/0332850 A1 Oct. 28, 2021

(51) Int. Cl.
*F16C 33/60* (2006.01)
*F16C 19/06* (2006.01)

(52) U.S. Cl.
CPC .............. *F16C 33/60* (2013.01); *F16C 19/06* (2013.01)

(58) Field of Classification Search
CPC ...... F16C 19/06; F16C 33/60; F16C 33/6614; F16C 33/6651; F16C 2360/23
See application file for complete search history.

(56) References Cited

U.S. PATENT DOCUMENTS

| | | | |
|---|---|---|---|
| 3,975,067 A * | 8/1976 | Martin | F16C 19/166 384/570 |
| 5,106,209 A * | 4/1992 | Atkinson | F16C 33/60 384/462 |
| 5,306,565 A * | 4/1994 | Corbin | C04B 37/006 428/432 |
| 8,973,271 B2 | 3/2015 | Normandin et al. | |
| 2014/0377586 A1 * | 12/2014 | Van De Sanden | B23K 35/0288 428/679 |
| 2016/0003100 A1 * | 1/2016 | Walker | F01D 25/16 415/116 |
| 2016/0318119 A1 * | 11/2016 | Strandell | B23K 20/023 |

* cited by examiner

*Primary Examiner* — Phillip A Johnson
(74) *Attorney, Agent, or Firm* — Norton Rose Fulbright Canada LLP

(57) ABSTRACT

An inner ring assembly for a ball bearing assembly includes a proximal inner ring made from a first material. The inner ring assembly further includes a distal inner ring made from a second material. The first material is different from the second material.

20 Claims, 2 Drawing Sheets

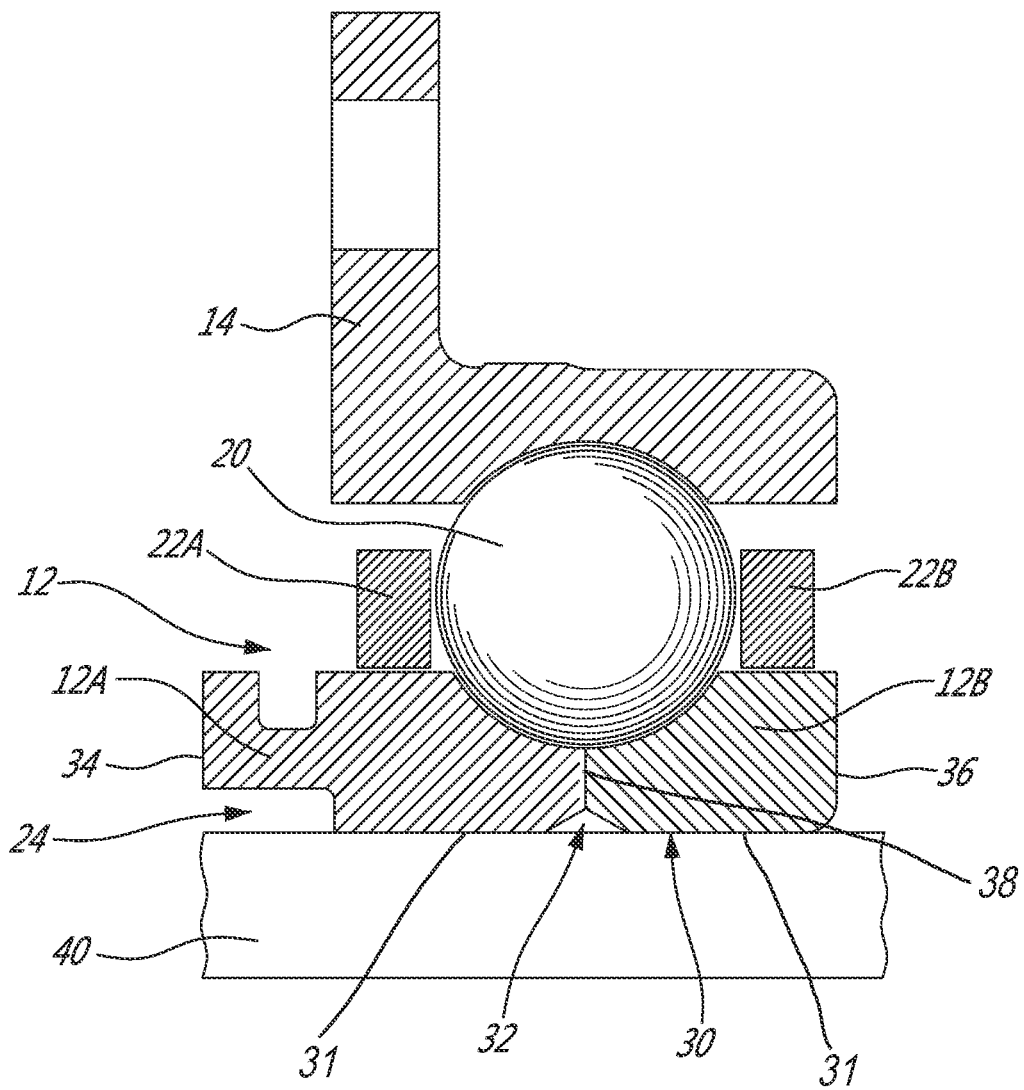

SPLIT BALL BEARING CONSTRUCTION

TECHNICAL FIELD

The application relates generally to ball bearing assemblies and, more particularly, to an inner ring for such an assembly.

BACKGROUND OF THE ART

Bearing assemblies such as ball bearings for gas turbine engines often include split inner ring sections that concurrently form an inner ring. The inner ring sections are made from the same material. Typically one section of the inner ring undergoes higher stresses or loads than the other, for example because only one side of the ball bearing makes contact with the rotating components, or due to loading from the ball. The stresses or loads on each inner ring section are thus not of the same magnitude and/or nature. Such stresses or loads may include raceway hoop stresses, bore hoop stresses, raceway contact stresses, under race oil lubrication feature stresses, etc. As the stresses are not the same for each inner ring section, typically the inner ring section undergoing higher stresses dictates the choice of material for both inner ring sections, leading to one inner ring section being over-engineered. In other cases, the nature of the stresses on each inner ring section calls for different materials for each inner ring section, rendering the choice of material to satisfy both sections' criteria difficult.

SUMMARY

In one aspect, there is provided an inner ring assembly for a ball bearing assembly, comprising a proximal inner ring made from a first material, and a distal inner ring made from a second material, wherein the first material is different from the second material.

In another aspect, there is provided a bearing assembly comprising an outer ring defining a central axis of rotation for the bearing assembly, an inner ring assembly disposed radially inwardly of the outer ring and cooperating therewith to form a roller volume, the inner ring assembly having a proximal inner ring made from a first material and a distal inner ring made from a second material, the first material different from the second material, and ball bearing elements in the roller volume rollingly disposed against an inner circumferential surface of the outer ring and an outer circumferential surface of the inner ring, the ball bearing elements allowing relative rotational motion between the outer ring and the inner ring.

In a further aspect, there is provided a method of assembling a bearing assembly, comprising positioning a plurality of bearing elements against an outer ring, obtaining a proximal inner ring made from a first material, obtaining a distal inner ring made from a second material, the second material different from the first material, and forming an inner ring assembly by positioning the proximal inner ring against the distal inner ring, thereby capturing the plurality of bearing elements between the inner ring assembly and the outer ring.

DESCRIPTION OF THE DRAWINGS

Reference is now made to the accompanying figures in which:

FIG. 2 is a schematic cross-section of part of the bearing assembly of FIG. 1.

DETAILED DESCRIPTION

Figure 1:
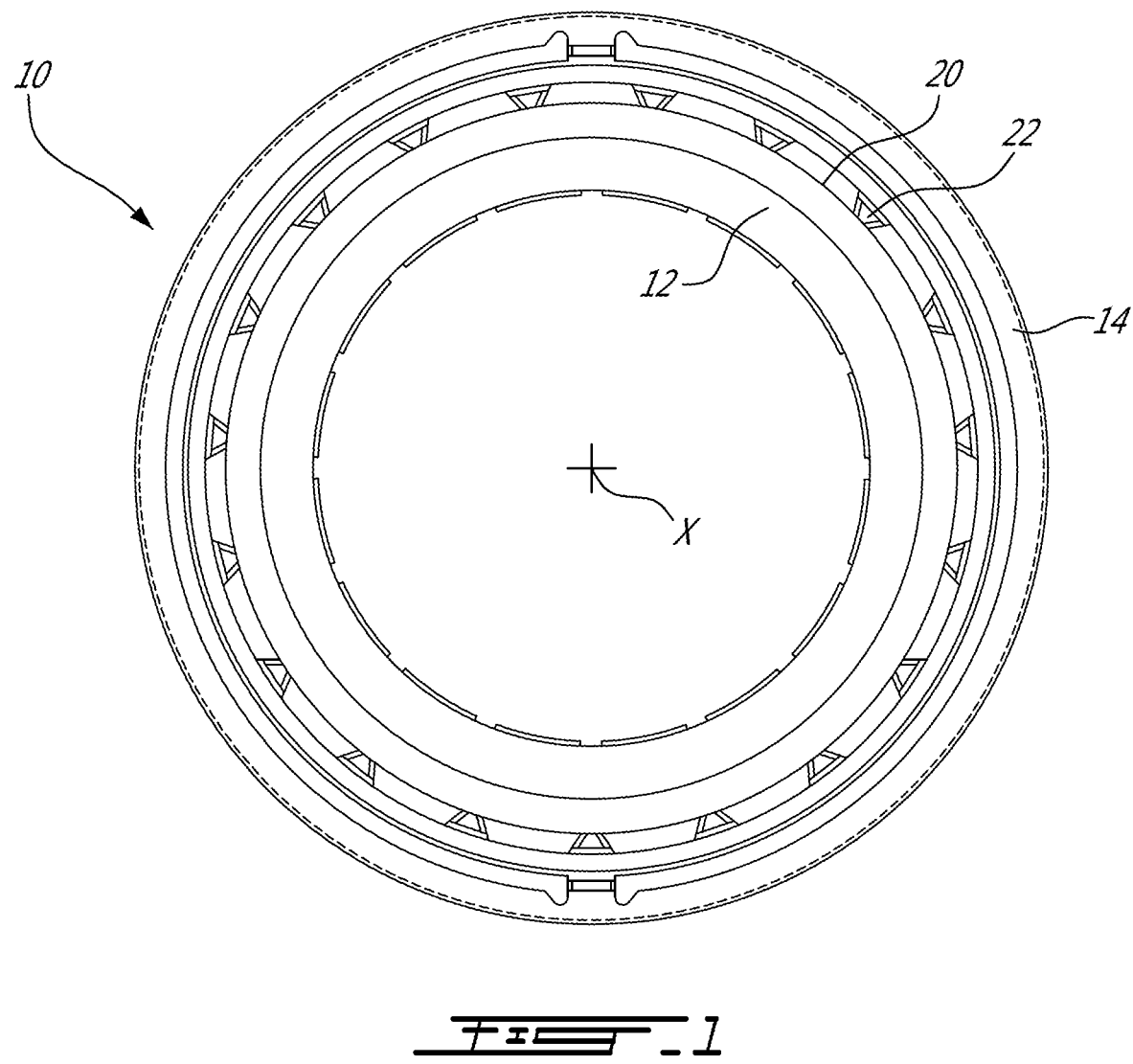
FIG. 1 is a schematic front view of a bearing assembly in accordance with a particular embodiment.

Referring to FIGS. 1 and 2, a bearing assembly 10 in accordance with a particular embodiment is shown. According to an embodiment, the bearing assembly 10 is a high speed ball bearing, in that it may rotate in excess of 2.0 MDN (bearing bore diameter in millimeters times speed in rpm divided by one million), although it may be used in bearing assemblies operating at lesser speeds. The bearing assembly 10 generally includes a concentric inner ring assembly 12, consisting of a proximal inner ring 12A and a distal inner ring 12B, and an outer ring 14 respectively defining concurrently a roller volume including inner and outer races in which a plurality of bearing elements 20 retained by a cage member 22 are received to allow relative rotation between the inner ring assembly 12 and outer ring 14. The proximal inner ring 12A and the distal inner ring 12B may also be referred to as inner ring sections, inner ring portions, split inner rings, etc. Together, the inner rings 12A and 12B form the inner ring assembly 12, a.k.a., split inner ring or simply inner ring. In use, the inner rings 12A and 12B are required for the bearing elements 20 to be retained in the bearing assembly 10. In various embodiments, inner rings 12A and 12B may be symmetrically shaped such that they are mirror images of each other, permitting reversible use of the bearing assembly 10. In other embodiments, the inner rings 12A and 12B are asymmetrically shaped such that the bearing assembly is conducive to unidirectional use. In the embodiments shown, the bearing elements 20 are balls bearings, but it is understood that other types of bearing elements can alternately be used, such as for example roller bearings and tapered bearings. The cage member 22 is received between the inner and outer rings 12, 14 and equally spaces the bearing elements 20 apart such that each bearing element 20 rotates around the inner and outer races without contacting the other bearing elements 20. In an embodiment, a given cage member 22 includes a proximal land 22A adjacent the proximal inner ring 12A and a distal land 22B adjacent the distal inner ring 12B.

Referring more particularly to FIGS. 1 and 2, the outer ring 14 has a ring body that is centered on a central axis X of the bearing assembly 10, with the outer race being defined on an inner surface thereof around its circumference. Although not shown in FIG. 2, the inner surface may be at the same diameter as the outer race. The inner ring assembly 12 may also be centered on the central axis X of the bearing assembly 10, with the inner race being defined on an outer surface thereof around its circumference. An oil gallery 24 may be defined at an exterior of the proximal inner ring 12A. In an embodiment, the bearing assembly 10 may be used for a main shaft of a gas turbine engine (not shown). In other embodiments, the bearing assembly may be used for other elements of a gas turbine engine, for example as gearbox bearings. In other embodiments, uses in environments besides for gas turbine engines may be considered as well.

Referring to FIG. 2, the inner ring assembly 12 includes an inner circumferential surface 30 that may include a plurality of axial slots 31 and a circumferential slot 32 defined therein to ensure the bearing assembly is sufficiently lubricated, for example via lubricating oil from the oil gallery 24. The axial slots 31 may extend through both the proximal inner ring 12A and the distal inner ring 12B, from a first axial face 34 to the circumferential slot 32 and from the circumferential slot 32 to a second axial face 36. The circumferential slot 32 may extend about the full circumference of the inner circumferential surface 30 (i.e., is continuous over 360 degrees). The circumferential slot 32 may be less than 360 degrees as well. However, as a single unit, the circumferential slot 32 is in fluid communication with each of the axial slots 31. The circumferential slot 32 may be located at a junction or meeting plane between the proximal inner ring 12A and the distal inner ring 12B, and, while not shown in the figures, may consist of a proximal circumferential slot portion in the proximal inner ring 12A and a distal circumferential slot portion in the distal inner ring 12B. The circumferential slot 32 may alternatively be entirely located in either one of the inner rings 12A or 12B.

The inner ring 12 also includes a plurality of radial passages defined therethrough (a.k.a, channels, through-bores, holes, etc), which may be proximal passages defined in the proximal inner ring 12A, distal passages defined in the distal inner ring 12B, and/or central passages 38 that extend into the inner ring assembly 12 from the circumferential slot 32. The proximal/distal passages may be defined as shoulder radial passages, whereas the central passages 38 may be defined as race radial slots or passages 38 (a.k.a., middle groove). For example, the shoulder radial passages feed the lubricating fluid to the cage 22 piloting surface at shoulders of the inner ring assembly 12 in the roller volume, illustratively to proximal land 22A and to distal land 22B, whereas the race radial passages extend through the inner ring assembly 12 to the inner race. The race radial passages may provide lubricating fluid directly to the bearing elements 20 and the inner race contact interface. The number of proximal radial passages, distal radial passages and central radial passages may vary, as well as their arrangements and ratios amongst themselves. In an embodiment, the axial slots 31, circumferential slot 32, and radial passages 38 function together as a series of fluid passages to deliver lubricating fluid to the bearing assembly 10 such that the bearing assembly 10 is lubricated proximally, centrally and distally. In an embodiment, once the inner ring 12 has been mounted to a shaft 40, for example the main shaft of a gas turbine engine (not shown), lubricating fluid is circulated to the inner ring 12, for example from a radial scoop or an axial scoop depending on the space available for the bearing assembly 10, via the gallery 24.

By fabricating the proximal inner ring 12A and distal inner ring 12B from different materials, examples of which are provided below, bearing assembly 10 is designed to meet different engineering requirements relating to stress and load resistance, while ensuring that the inner ring portion 12A, 12B subjected to less stress is not needlessly over-engineered. Conversely, if each inner ring portion 12A, 12B is subjected to a different form of stress, different material choices can be made to account for this. Such varying stresses may include, for example, hoop stresses at the raceway, hoop stresses at the bore, contact stresses at the raceway, or stresses at the geometric features allowing for under race oil lubrication, such as the circumferential slot 32 and any axial slots and/or radial passages. Different materials may be chosen for each inner ring 12A, 12B to take advantage of the different material properties needed for each inner ring 12A, 12B.

In an exemplary embodiment, a bearing assembly 10 in use includes a loaded distal inner ring 12B undergoing high contact stresses at its raceway. To account for such stresses, the distal inner ring 12B may be made from, for example, a M50 or M50-NIL steel due to their relatively long lifespans among steels, in addition to their other advantageous properties. The non-loaded proximal inner ring 12A, on the other hand, does not undergo such stresses and thus does not need to be made from such materials. For example, the non-loaded proximal inner ring 12A may be made from 52100 steel to reduce the overall cost of the bearing assembly 10. The choice of material for the non-loaded proximal inner ring 12A may additionally be made for other considerations, for example lead time, weight, etc. It is to be understood that in other embodiments the proximal inner ring 12A is subjected to higher stresses while the distal inner ring 12B is subjected to lesser stresses, leading to different material choices, for example the proximal inner ring 12A being made from one of a M50 or M50-NIL steel and the distal inner ring 12B being made from 52100 steel.

In another exemplary embodiment, a bearing assembly 10 in use includes a loaded distal inner ring 12B undergoing high hoop stresses at its raceway. To account for such stresses, the distal inner ring 12B may be made from, for example, a M50-NIL steel due to its high ductility, among other advantageous characteristics. In such an embodiment, the non-loaded proximal inner ring 12B may undergo hoop stresses at its bore that may be too high for M50-NIL steel, requiring a different choice in material for the proximal inner ring 12A. Thus, the proximal inner ring 12A may be made from M50 steel to withstand the high hoop stresses at its bore, while the distal inner ring 12B may be made from M50-NIL steel to withstand the high hoop stresses at its raceway. It is to be understood that a bearing assembly 10 with opposite stresses as described above may include, for example, a proximal inner ring 12A made from M50-NIL steel and a distal inner ring 12B made from M50 steel, among other possibilities.

As such, the choice of material for each of the proximal inner ring 12A and the distal inner ring 12B may be made independently of the other to account for each of their operational characteristics depending on their specific use, without having to over-engineer the other. A bearing assembly 10 with inner rings 12A, 12B made from different materials thus provides the bearing assembly 10 with the benefits of both materials' properties for corresponding loading conditions. The choice in different materials may, for example, be made for design purposes (i.e. load and stress), manufacturing purposes (i.e. lead time, cost of materials) etc. Other factors may be considered as well.

In an embodiment, the present disclosure further teaches a method of manufacturing an inner ring 12 for a ball bearing assembly 10. A proximal inner ring 12A of the ball bearing assembly 10 is fabricated from a first material. A distal inner ring 12B of the ball bearing assembly 10 is fabricated from a second material that is different from the material. As discussed above, the choice of the first and the second material is based on factors such as the stresses and loads on each of the inner rings 12A, 12B while avoiding over-engineering the other of the inner rings 12A, 12B undergoing less stresses or loads. Then, the proximal inner ring 12A and the distal inner ring 12B are operatively coupled to form the inner ring 12 of the bearing assembly 10.

In an embodiment, the present disclosure further teaches a method of assembling a bearing assembly 10, for example a high speed ball bearing assembly. A plurality of bearing elements 20, for example ball bearing elements, are positioned against an outer ring 14 of the bearing assembly 10. Then, a proximal inner ring 12A made from a first material is obtained, and a distal inner ring 12B made from a second material different from the first material is obtained. An inner ring assembly 12 is formed by positioning the proximal inner ring 12A against the distal inner ring 12B, thereby capturing the plurality of bearing elements 20 between the inner ring assembly 12 and the outer ring 14.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A split inner ring for a ball bearing assembly having a central axis of rotation, comprising:
    a proximal inner ring section made from a first material; and
    a distal inner ring section made from a second material and positioned against the proximal inner ring section to form the split inner ring, the proximal inner ring section positioned axially adjacent to the distal inner ring section;
    wherein the first material is different from the second material; and
    wherein the split inner ring includes an outer circumferential surface operable to receive a plurality of ball bearing elements in contact with both the proximal inner ring section and the distal inner ring section.

2. The split inner ring as defined in claim 1, wherein one of the first material or the second material is M50 steel.

3. The split inner ring as defined in claim 1, wherein one of the first material or the second material is M50-NIL steel.

4. The split inner ring as defined in claim 1, wherein one of the first material or the second material is 52100 steel.

5. The split inner ring as defined in claim 1, wherein the proximal inner ring section and the distal inner ring section are symmetrically shaped.

6. The split inner ring as defined in claim 1, wherein the hardness of the first material differs in magnitude from the hardness of the second material.

7. The split inner ring as defined in claim 1, wherein the proximal inner ring section and the distal inner ring section comprise a plurality of axial slots, a circumferential slot and a plurality of radial slots.

8. A bearing assembly comprising:
    an outer ring defining a central axis of rotation for the bearing assembly;
    a split inner ring disposed radially inwardly of the outer ring and cooperating therewith to form a roller volume, the split inner ring having a proximal inner ring section made from a first material and a distal inner ring section made from a second material and positioned against the proximal inner ring section to form the split inner ring, the proximal inner ring section positioned axially adjacent to the distal inner ring section, the first material different from the second material; and
    ball bearing elements in the roller volume rollingly disposed against an inner circumferential surface of the outer ring and an outer circumferential surface of the split inner ring, the ball bearing elements in contact with both the proximal inner ring section and the distal inner ring section and allowing relative rotational motion between the outer ring and the inner ring.

9. The bearing assembly defined in claim 8, wherein the split inner ring further includes an inner circumferential surface having a plurality of axial slots, a circumferential slot, and a plurality of radial slots for delivering lubricating fluid to the bearing assembly.

10. The bearing assembly as defined in claim 8, wherein one of the first material or the second material is M50 steel.

11. The bearing assembly as defined in claim 8, wherein one of the first material or the second material is M50-NIL steel.

12. The bearing assembly as defined in claim 8, wherein one of the first material or the second material is 52100 steel.

13. The bearing assembly as defined in claim 8, wherein the bearing assembly is a high speed bearing assembly of at least 2.0 MDN.

14. The bearing assembly as defined in claim 8, wherein the proximal inner ring section and the distal inner ring section are symmetrically shaped.

15. The bearing assembly as defined in claim 8, wherein the hardness of the first material differs in magnitude from the hardness of the second material.

16. A method of assembling a bearing assembly, comprising:
    positioning a plurality of bearing elements against an outer ring;
    obtaining a proximal inner ring made from a first material;
    obtaining a distal inner ring made from a second material, the second material different from the first material; and
    forming an inner ring assembly by positioning the proximal inner ring against the distal inner ring, thereby capturing the plurality of bearing elements between the inner ring assembly and the outer ring.

17. The method as defined in claim 16, further comprising adding a cage member around the plurality of bearing elements.

18. The method as defined in claim 16, further comprising selecting the proximal inner ring and the distal inner ring such that one of the first material or the second material is M50 steel or M50 NIL steel.

19. The method as defined in claim 16, further comprising operating the bearing assembly at at least 2.0 MDN.

20. The method as defined in claim 16, further comprising selecting the proximal inner ring and the distal inner ring such that the hardness of the first material differs in magnitude from the hardness of the second material.

* * * * *